H. W. Collender.
Impt's in Billiard table cushions.
71282
PATENTED
NOV 26 1867
Fig: 1.
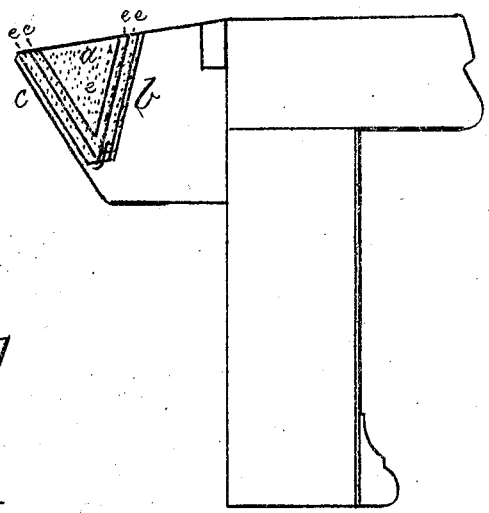
Fig: 4.
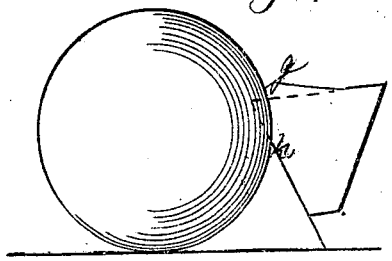
Fig: 2.
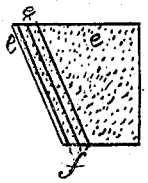
Fig: 3.
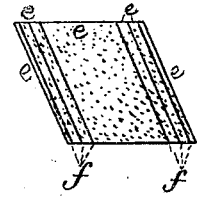
Witnesses
Wm H Bishop
A. De Lacy.
H. W. Collender

UNITED STATES PATENT OFFICE.

HUGH W. COLLENDER, OF NEW YORK, N. Y.

IMPROVEMENT IN BILLIARD-CUSHIONS.

Specification forming part of Letters Patent No. 71,282, dated November 26, 1867.

*To all whom it may concern:*

Be it known that I, HUGH W. COLLENDER, of the city, county, and State of New York, have invented certain new and useful Improvements in Billiard-Table Cushions; and I do hereby declare that the following is a full, clear, and exact description thereof, reference being had to the accompanying drawings, making part of this specification, in which—

Figure 1 is a cross-section of an india-rubber cushion for billiard-tables with the backing and the cloth covering; and Figs. 2 and 3 are cross-sections of such cushions representing only one of my said improvements.

My present invention relates to improvements on india-rubber cushions described in Letters Patent of the United States heretofore granted to me.

The billiard-table cushions described in Letters Patent heretofore granted to me are composed of what is known as "soft vulcanized rubber," with a layer on the face rendered harder by the admixture of fibrous substances with the india-rubber while in the green or plastic state; and while the body of the cushion and the hard layer are in the green or plastic state they are united by pressure, and then together vulcanized to insure a perfect union of the two; and by a subsequent improvement, also described in Letters Patent heretofore granted to me, the layer of harder rubber is in like manner united to a thin outer layer of the soft vulcanized india-rubber placed next to the cloth.

To obtain the required good effect from the use of the facing or inner layer of vulcanized rubber rendered harder, as above stated, it is necessary to make such layer of considerable thickness, and as the india-rubber so rendered harder thereby loses much of that kind of elasticity which imparts the rebound to the ball when compressed by the blow, and which is possessed in a high degree by soft vulcanized india-rubber, the required thickness of such hard facing or inner layer, while it does materially improve india-rubber cushions, fails nevertheless to produce the full measure of elasticity desirable in billiard-table cushions.

The object of the first part of my present invention is to produce billiard-table cushions which shall possess a greater reacting force than cushions made as heretofore, and which, when made low, that the ball can be readily reached by the cue, will not cause the ball to "jump," as it is termed, when it strikes the cushion with considerable force.

I have ascertained by experiment that when vulcanized india-rubber is entirely confined laterally, so that it cannot spread laterally, the reacting force which it will impart is nearly equal to the direct force with which it was struck, but that if not so held laterally when struck it will spread, and for that reason fail to react with sufficient force.

It is on this fact that the first part of my present invention is based; and with this view my said invention consists of a new manufacture of billiard-table cushions composed of alternate layers of soft vulcanized india-rubber and two or more of cloth, or other thin pliable substance which will not readily stretch, previously coated with india-rubber, the whole being united while the india-rubber is in the green or plastic state, and then vulcanized. The two or more layers of cloth or equivalent substance have the effect of binding together the interposed layers, so as to prevent the spread of the india-rubber when the cushion is struck by a ball, thereby obtaining a greater reacting force than by cushions differently constructed. The face of cushions incline inward, so that when struck by the ball the reacting force of the cushion shall be exerted on the ball above the horizontal plane of its axis. This is to prevent the ball from jumping, as it is termed. This form of cushion admits of being made sufficiently low that the player may reach the ball with the cue when close to the cushion. But this form of cushion when made, as heretofore, of the soft vulcanized india-rubber, does not effectually prevent the jumping of the ball, for the reason that when struck with force the upper part of the face bends back too far, the body of india-rubber spreading upward and the front face stretching upward, so that on the reacting the force has a tendency to make the ball jump. This tendency is prevented by my said improvement, as the interposed layers of cloth or equivalent substance will prevent the layers of india-rubber from stretching and spreading upward.

And the second part of my said invention consists in making billiard-table reversible cushions with both faces inclining inward from parallel planes at right angles to the top surface, by reason of which form I am enabled to produce cushions with a materially less weight of india-rubber than by any plan heretofore known, and with an equal thickness where the elastic force is required.

In Figure 1 of the accompanying drawings, a represents a cushion of the improved form, with one face against the backing b, and with the other face covered with the cloth c. When the outer face becomes injured in any way, by simply removing the cloth and reversing the cushion a that face which was against the backing b becomes the active face, the top remaining the same. By this form I am enabled to make a reversible cushion with less material than has heretofore been required even for a non-reversible cushion.

The mode which I have practiced with success in making cushions according to the first part of my said invention is to take strips of thin but strong cotton or linen cloth, of about the length of the intended cushion, and about as wide as the depth of the face of the intended cushion. These strips of cloth are coated on both faces with the preparation of india-rubber suitable for vulcanization, which is done, as is well known to india-rubber manufacturers, by means of strong calendering-rollers, taking care that the rubber shall be well forced into the meshes of the cloth. I take the strips so coated, either singly or two or more of them united by passing them together between calendering-rollers, and, whether single or compound, place two or more of them between strips of prepared india-rubber of the required thickness, as represented in the accompanying drawings, where e represents the layers of india-rubber, and f the layers of prepared cloth; and while the india-rubber is still in the green or plastic state I cause the several surfaces to unite by pressure, and then the whole is subjected to the usual vulcanizing process, by which the several layers become as thoroughly united as if made of a single piece of prepared rubber.

When the cushion is made reversible, of the improved form hereinabove described, the series of layers for the two sides should incline in opposite directions, as represented in Fig. 1; but in cushions of the forms represented by Figs. 2 and 3, they should all incline in the same direction.

In Fig. 4 of the accompanying drawings I have represented the form which a cushion would assume, if made as heretofore, when struck by the ball with considerable force, the line g indicating the swell at the top, due to the spread of the india-rubber, and h the curved line of the face, due to the stretching of the rubber from the lower to the upper edge.

I have stated above that I use thin but strong cotton or linen cloth for the non-stretchable layers, because I have used such with success, and such strips can be readily obtained of the required size; but I do not wish to be understood as limiting my claim of invention to such, as other substances, such as animal membrane, may be substituted, the object being to use some material which is flexible, and which will not readily stretch.

What I claim as the first part of my said invention, and desire to secure by Letters Patent, is—

1. A new manufacture of strips for billiard-table cushions, composed of layers of soft vulcanized india-rubber and two or more interposed layers of cloth, or other equivalent material, previously coated with india-rubber, the whole united and together vulcanized, substantially as and for the purpose specified.

2. And I also claim, as the second part of my said invention, vulcanized india-rubber strips for billiard-table reversible cushions, of the form substantially such as herein described.

H. W. COLLENDER.

Witnesses:
WM. H. BISHOP,
A. DE LACY.